United States Patent Office 3,484,582
Patented Dec. 16, 1969

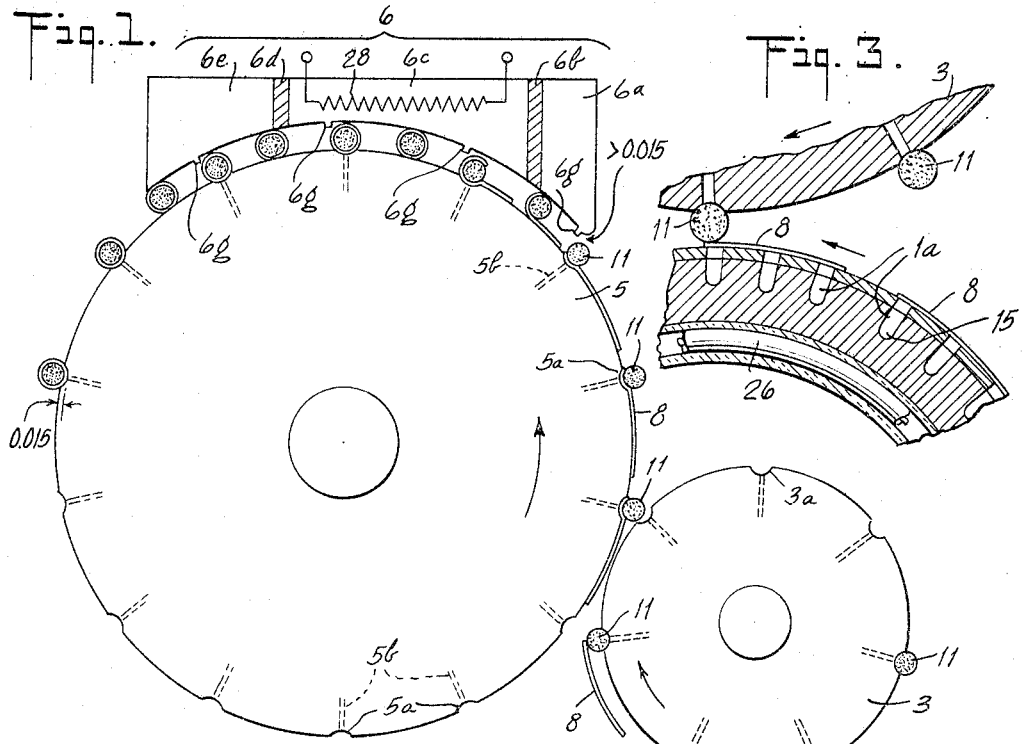
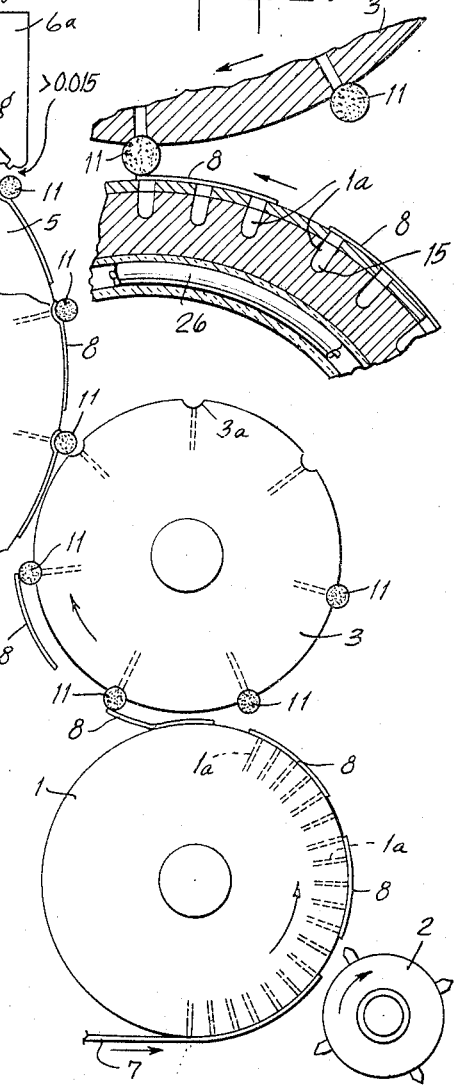
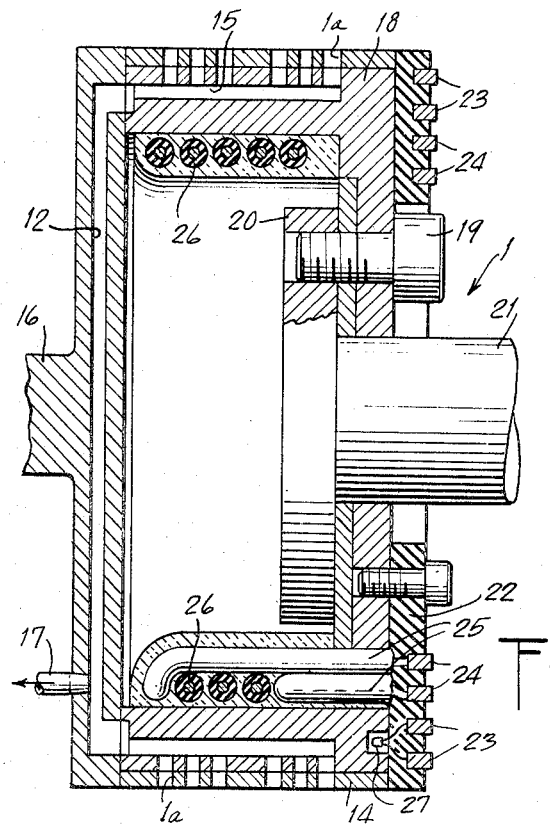

3,484,582
APPARATUS FOR HEATING SHEET MATERIAL
Colin S. McArthur, Winston-Salem, N.C., assignor to R. J. Reynolds Tobacco Company, Winston-Salem, N.C., a corporation of New Jersey
Original application Jan. 5, 1967, Ser. No. 607,539, now Patent No. 3,420,243, dated Jan. 7, 1969. Divided and this application Sept. 10, 1968, Ser. No. 758,864
Int. Cl. H05b 3/02; B21d 27/06
U.S. Cl. 219—469    3 Claims

ABSTRACT OF THE DISCLOSURE

Apparatus comprising a drum with an internal electrical heater, for heating patches of sheet material coated with heat activatable bonding material. The drum is rotatable about its axis and comprises an outer perforated shell and an inner shell flanged to maintain a space between the shells. The shells are closed at both ends and the enclosed space connected to a vacuum maintaining means. The difference between the external pressure (usually atmospheric) and the internal pressure communicated through the perforations, is sufficient to hold the patches on the surface of the drum while they are being heated. The electrical heater may be a heating coil, electrically connected to a set of slip rings to allow rotation. The drum may also contain an electrical temperature responsive means similarly connected to a second set of rings, and thereby adapted for connection to an electrical control system for regulating the current in the heating coil to maintain the drum surface at a constant temperature, high enough to activate the bonding material as the patches move over the drum.

CROSS-REFERENCE

This is a division of my copending application Ser. No. 607,539, filed Jan. 5, 1967, now Patent No. 3,420,243 entitled Apparatus of Making Filter Tip Cigarettes.

BACKGROUND OF THE INVENTION

In the manufacture of filter tip cigarettes, it has been the practice in the past to assemble a section of cigarette rod with a section of filter material, and to connect the two sections by wrapping around their abutting ends a patch of sheet material, commonly called tipping material. This tipping material is coated with a liquid bonding agent before it is wrapped around the cigarette unit, and the bond is set by drying the liquid bonding agent after the connection is completed. The handling of the tipping material coated with the liquid bonding agent entails some spilling of the bonding material, with the resultant necessity to stop the machine occasionally to clean up the spilled material.

There have been available for many years, a class of heat-activatable (or "heat-sealing") bonding materials, which are dry at room temperatures, but which are rendered tacky by heating to about 150°–200° F. These materials have not heretofore been used for manufacturing filter tip cigarettes, because the machinery of the prior art has not been adapted to heating the material before the bonding, and cooling it after the bonding. Furthermore, when such a bonding material is used, the bond is not secure until the bonding material is cooled. Consequently, there is a tendency for the bond to separate after it is initially formed, with the result that the finished cigarette is defective.

SUMMARY OF THE INVENTION

This apparatus is to be used to heat sheet material coated with heat activatable material. Strips of the sheet material are fed to the surface of the drum, cut to the desired sized patch, and held to the drum by maintaining a difference between the internal and external pressures, the internal pressure being communicated to the patches through apertures in the drum. The drum contains an electrical heating coil, maintained at the proper temperature with the help of an electrical temperature responsive means in the drum. As the drum rotates, the sheet material is heated and its outer surface becomes tacky. A second drum, with cigarette units held to it, rotates so that the leading edge of the tacky patch is pressed against and thereby attaches to a cigarette unit moving tangentially to the drum. As the motion of the cigarette unit continues, the patch is pulled away from the heating drum.

DESCRIPTION OF THE DRAWING

FIG. 1 is a somewhat diagrammatic view illustrating apparatus for making filter tip cigarettes, including means constructed in accordance with the invention for heating tipping materials;

FIG. 2 is an enlarged cross-sectional view of a patch heating drum forming part of the apparatus of the invention;

FIG. 3 is an enlarged cross-sectional view showing the initial contact between the cigarette units on a transfer drum and the patches on the patch heating drum.

DETAILED DESCRIPTION

FIG. 1 shows the invention in its use as part of an apparatus for covering assembled cigarette units with patches of tipping material coated with heat activatable adhesive. The apparatus illustrated in FIG. 1 includes not only the present invention, namely a tipping material heating drum 1, but also a cutter 2, cooperating with that drum, a transfer drum 3 to which assembled filter cigarette units are supplied by conventional apparatus, not shown, a rolling drum 5 and a rolling shoe cooperating with the rolling drum and generally indicated at 6.

The tipping material is supplied as a strip or sheet, as illustrated at 7, and passes around the periphery of the heating drum 1. The material 7 is coated on its outer surface with a suitable heat-activatable bonding material, e.g., one of the vinyl acetate acrylic-copolymers. The drum 1 is provided with spaced apertures 1a which communicate with an evacuated chamber, and which are effective to hold the strip material 7 on the surface of the drum. The drum 1 cooperates with a cutter 2 which cuts the strip material into patches 8, each big enough to wrap a single cigarette. The drum 1 is operated at a peripheral speed slightly greater than the linear speed of the supply of the strip material 7 so that the patches 8 become separated on the surface of the drum 1, as shown. Each cigarette unit 11 typically consists of a double length filter section, as shown at 9 in FIG. 2 and two cigarette rod sections 10, with each cigarette rod section having one of its ends abutting an end of the filter section 9. The term "cigarette unit" as used in this specification is intended to be generic to: (a) such a double length unit; and (b) single length units as shown at 13.

The transfer drum 3 and the heater drum 1 are so mounted and spaced that each cigarette unit 11 which is held in a recess 3a by vacuum means on the periphery of the transfer drum 3, touches tangentially and with light pressure the leading edge of one of the patches 8 carried by the heater drum 1. At the same time, the apertures 1a under that leading edge pass out of communication with a vacuum manifold 12 so that the tipping patch, whose heat-activatable bonding material has become tacky by the effect of the heat of the drum 1, sticks to the abutting cigarette unit along one elongated cylindrical element thereof. The patch is gradually released from the heater drum as the rotation of that drum and the transfer drum continues, so that the cigarette unit 11 continues with the periphery of the transfer drum 3, having the patch 8 attached thereto and following behind it. The transfer drum 3 cooperates tangentially with a rolling drum 5 also provided with recesses 5a to receive cigarette units. Each recess 5a communicates with a passage 5b, in which a vacuum is maintained to hold the cigarette units on the periphery of the drum. The recesses 5a are somewhat shallower than corresponding recesses 3a on the transfer drum, so as to make it easier for the rolling mechanism to begin to roll a cigarette unit out of one of the recesses 5a. Preferably, the depth of each recess 5a is about 0.015″. This depth is exaggerated in the drawing, for purposes of clarity. As the cigarette unit with attached patch 8 approaches the top of the rolling drum 5, it encounters the rolling shoe 6 which comprises an initial unheated section 6a separated by an insulating spacer 6b from a rolling section 6c heated by a coil 28. The section 6c is separated by another heat insulating spacer 6d from a third, unheated rolling shoe section 6e.

The bottom of the shoe 6 is provided with a plurality of ridges 6g, extending parallel to the axis of rotation of drum 5. The purpose of each ridge 6g is to engage the periphery of a passing cigarette resting in one of the recesses 5a, and start it rolling out of that recess, and between periphery of the drum 5 and the arcuate surface of the shoe 6.

FIGS. 2 AND 3

This figure illustrates the heating drum 1, which includes an outer cylindrical shell of hard heat-resistant material, for example, tungsten carbide, shown generally at 14. The passages 1a are arranged in rows, and each row communicates with a passage 15 that extends axially of the drum. The axial passages communicate, during a portion of their rotation, with a manifold 12 mounted on a fixed support 16, and connected by means of a conduit 17 to a suitable source of subatmospheric pressure. The outer shell 14 is mounted on an inner shell 18 which is in turn mounted by means of bolts 19 to a flange 20 attached to the end of a driving shaft 21.

On the right-hand outer face of the inner shell 18 is mounted an insulating plate 22, which may be of suitable plastic material, and in which are embedded two sets of slip rings 23 and 24. The slip rings 24 communicate through wires 25 with a heater winding 26 located internally of the shell 18. A thermocouple 27, or other suitable temperature sensitive element is embedded in the shell 18 and connected through suitable wires to the other set of slip rings 23. Brushes (not shown) cooperate with the slip rings 23 and 24. The temperature indicated by the thermocouple 27 may be used to control the current to the heater winding 26 and alternatively, the temperature indication from thermocouple 27 may be used simply to operate an indicator or recorder, and the current flow to the winding 26 may be manually controlled.

I claim:
1. Apparatus for heating sheet material, wherein the improvement comprises:
   (a) an outer cylindrical shell having apertures in its periphery;
   (b) an inner cylindrical shell having a flange at one end engaging the outer shell and holding it spaced from the inner shell, said inner shell having a web closing one end of the shell;
   (c) a rotatable shaft connected to the web for rotating the shells;
   (d) means closing the other end of the shells including conduit means connected to the space between the shell and adapted when connected to a source of vacuum to maintain said space at a subatmospheric pressure;
   (e) a heater winding within the inner shell;
   (f) an insulating plate on the outside of said web;
   (g) a pair of slip rings on the outside of the plate; and
   (h) means electrically connecting the slip rings to the heater winding.
2. Apparatus as defined in claim 1, including:
   (a) electrical temperature responsive means within at least one of said shells;
   (b) a second pair of slip rings on the outside of the plate; and
   (c) means electrically connecting the second pair of slip rings to the temperature responsive means.
3. Apparatus as defined in claim 1, in which said outer shell is of tungsten carbide.

References Cited

UNITED STATES PATENTS

| | | | |
|---|---|---|---|
| 3,123,700 | 4/1964 | Snyder et al. | 219—388 |
| 3,211,893 | 10/1965 | Barlow et al. | 219—469 |
| 3,217,137 | 11/1965 | Weitzner | 219—244 |

BERNARD A. GILHEANY, Primary Examiner

F. E. BELL, Assistant Examiner